(12) United States Patent
Burkholder et al.

(10) Patent No.: US 8,799,166 B1
(45) Date of Patent: Aug. 5, 2014

(54) PROVIDING A GIFT OF DOWNLOADABLE DIGITAL CONTENT

(75) Inventors: Thomas K. Burkholder, North Vancouver (CA); David L. Neumann, Portland, OR (US); Debra Ameerally, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1769 days.

(21) Appl. No.: 11/249,040

(22) Filed: Oct. 11, 2005

(51) Int. Cl.
*G06F 21/00* (2013.01)
*G06Q 30/00* (2012.01)

(52) U.S. Cl.
USPC .................................. 705/51; 705/14; 705/26

(58) Field of Classification Search
USPC ....................................................... 705/1–79
See application file for complete search history.

(56) References Cited

U.S. PATENT DOCUMENTS

| | | | | |
|---|---|---|---|---|
| 6,321,211 B1* | 11/2001 | Dodd | | 705/26.8 |
| 6,999,941 B1* | 2/2006 | Agarwal | | 705/26.2 |
| 2001/0056395 A1* | 12/2001 | Khan | | 705/37 |
| 2002/0120564 A1* | 8/2002 | Strietzel | | 705/40 |
| 2002/0143626 A1* | 10/2002 | Voltmer et al. | | 705/14 |
| 2002/0161702 A1* | 10/2002 | Milberger et al. | | 705/39 |
| 2002/0193159 A1* | 12/2002 | Maejima | | 463/20 |
| 2003/0061566 A1* | 3/2003 | Rubstein et al. | | 715/500.1 |
| 2003/0074265 A1* | 4/2003 | Oshima | | 705/26 |
| 2003/0135459 A1* | 7/2003 | Abelman et al. | | 705/40 |
| 2003/0171997 A1* | 9/2003 | Eaton | | 705/26 |
| 2003/0226012 A1* | 12/2003 | Asokan et al. | | 713/156 |
| 2004/0167826 A1* | 8/2004 | Kobayashi et al. | | 705/26 |
| 2005/0108096 A1* | 5/2005 | Burger et al. | | 705/14 |
| 2005/0119936 A1* | 6/2005 | Buchanan et al. | | 705/14 |
| 2005/0147083 A1* | 7/2005 | Domschitz et al. | | 370/351 |
| 2005/0165641 A1* | 7/2005 | Chu et al. | | 705/14 |
| 2005/0182678 A1* | 8/2005 | Walker et al. | | 705/14 |
| 2005/0222846 A1* | 10/2005 | Tomes | | 704/275 |
| 2005/0261988 A1* | 11/2005 | Horel et al. | | 705/27 |
| 2006/0031826 A1* | 2/2006 | Hiramatsu et al. | | 717/168 |
| 2006/0080702 A1* | 4/2006 | Diez et al. | | 725/30 |
| 2006/0149398 A1* | 7/2006 | Sato et al. | | 700/94 |
| 2006/0213975 A1* | 9/2006 | Krishnan et al. | | 235/380 |
| 2006/0248447 A1* | 11/2006 | Makkonen | | 715/513 |
| 2007/0004506 A1* | 1/2007 | Kinsley et al. | | 463/29 |
| 2007/0203788 A1* | 8/2007 | Andalib et al. | | 705/14 |
| 2010/0317401 A1* | 12/2010 | Lee et al. | | 455/557 |

* cited by examiner

*Primary Examiner* — Alexander Kalinowski
*Assistant Examiner* — Murali Dega
(74) *Attorney, Agent, or Firm* — Novak Druce Connolly Bove + Quigg LLP

(57) ABSTRACT

Providing digital content is disclosed. An indication that one or more arbitrarily selected downloadable items of third party prerecorded digital content are to be given as a gift is received. A request to deliver the one or more arbitrarily selected downloadable items of third party prerecorded digital content to a recipient of the gift is processed.

27 Claims, 11 Drawing Sheets

PROVIDING A GIFT OF DOWNLOADABLE DIGITAL CONTENT

BACKGROUND OF THE INVENTION

The sale and/or distribution of digital content, such as music, videos, documents, etc., over a network, such as the Internet, is a growing industry. Typically a user visits a website from which digital content of a desired type is known or believed to be available for download, locates a digital content item of interest—e.g., a particular song, album, video, document, etc.—selects the content for download, and satisfies the requirements, if any, required to be met to download the content, e.g., by completing a purchase transaction, providing a promotional or other code, providing requested information, etc.

A variety of mechanisms have been used to provided downloadable digital content without requiring the recipient to complete a purchase transaction. In some cases, special promotional campaigns have been undertaken pursuant to which codes and/or other data that a consumer and/or other targeted person or group can redeem to obtain free or discounted digital content have been distributed, e.g., on physical articles, electronically, etc. Some services enable a user to purchase a physical and/or electronic "gift certificate", card, code, etc. that can be given as a gift to another who can then use the gift to purchase digital content from the service. However, such gifts are essentially gifts of money and do not enable a user to give a gift of specific digital content selected by the user. Finally, special codes have been provided, e.g., in connection with the purchase of a physical article to which digital content associated with the special code is related—e.g., a player or other device configured to render the digital content—to enable a holder of the special code to download a set of related digital content items, such as all of the albums and songs of a particular band. However, such sets of content have in the past been predetermined by a vendor and/or other source of downloadable digital content, not items arbitrarily selected by a user, and in the past such codes have been bundled with other purchased goods and/or services and provided to and for the benefit of a purchaser of such goods and/or services, not made available to be given as a gift by one user to another. Therefore, there is a need for a way to enable a user to purchase and give to another user as a gift an arbitrarily selected set of one or more digital content items selected by the giving user.

BRIEF DESCRIPTION OF THE DRAWINGS

Various embodiments of the invention are disclosed in the following detailed description and the accompanying drawings.

DETAILED DESCRIPTION

Figure 1:
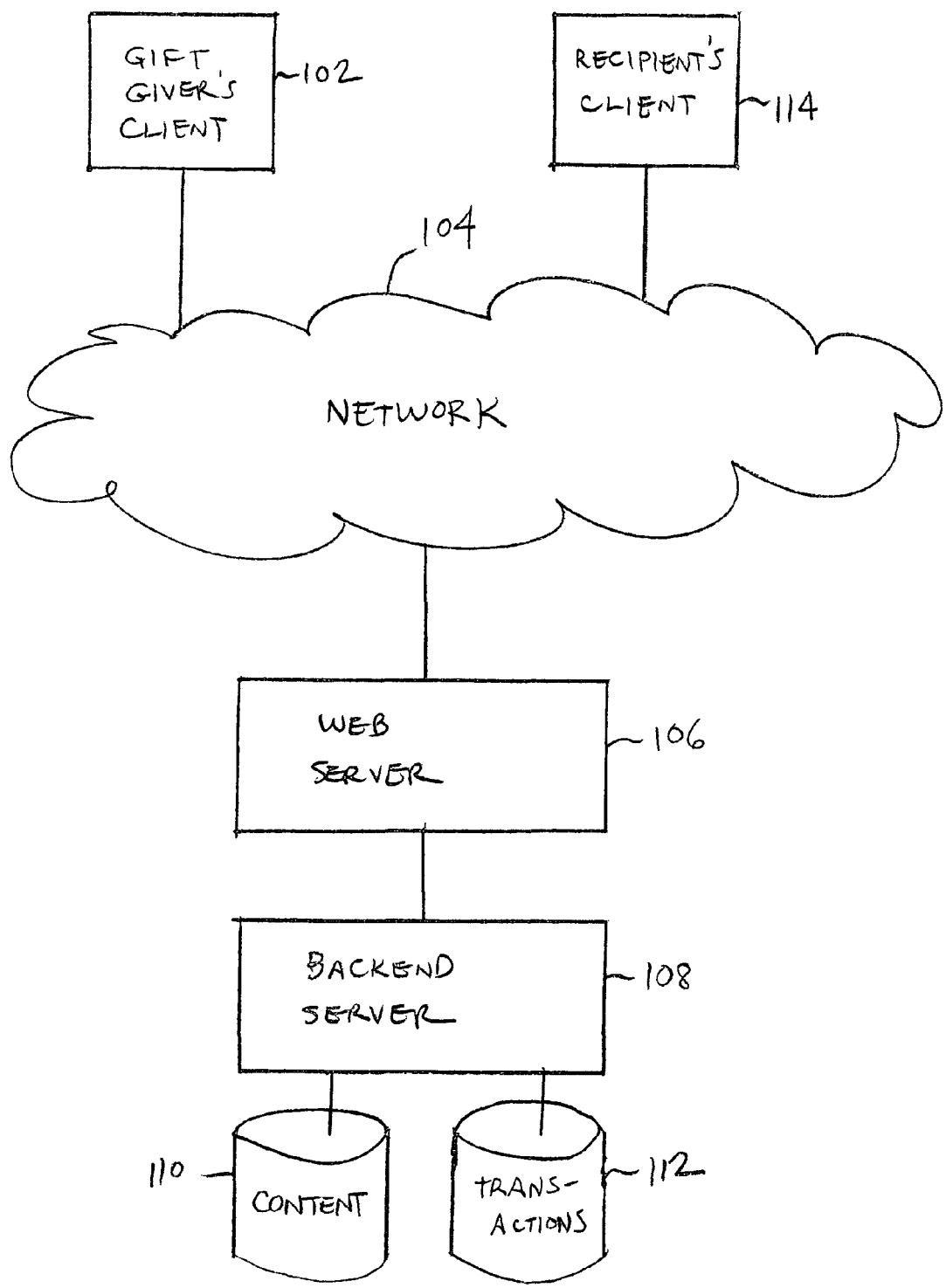
FIG. 1 illustrates an embodiment of a system for giving a gift of downloadable digital content.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Giving a gift of third party prerecorded digital content is disclosed. In some embodiments, an indication is received that one or more items of third party prerecorded digital content are to be given as a gift. Payment for the items to be given as a gift in various embodiments is obtained either at the time the gift is given and/or at the time the items are delivered to the gift recipient(s). The items are delivered, e.g., by download, to the recipient(s) of the gift.

As used herein, the term "digital content" refers to data that can be rendered by an associated device, system, application, and/or process to provide to an output capable of being perceived by one or more senses and/or sensors. Examples of digital content include, without limitation, sound recordings and other audio data, video data such movies and music videos, images, documents, and data configured to be rendered to provide experiences of texture, temperature, force, pressure, and/or smell. As used herein, the term "item of third party prerecorded digital content" refers to an item of downloadable digital content—e.g., a file and/or a discrete and separately downloadable portion of a file and/or other unit of content—that has been recorded, filmed, created, coded, or otherwise captured, stored, generated, and/or set in some digital form and/or medium by an authoring, producing, and/or reproducing user, device, process, system, or other recording or producing unit and/or entity other than a consumer (e.g., purchasing user, gift giver, gift recipient) of such digital content. Examples of third party prerecorded digital content items include music and other sound recordings (songs, albums, collections of songs and/or albums, etc.), videos (digitally recorded and/or stored movies, for example), digital representations of paintings and other visual works of art, software, documents, and other digital content created by someone other than a consumer to whom the digital content is intended to be provided (e.g., by download) and rendered, used, executed, or otherwise consumed.

FIG. 1 illustrates an embodiment of a system for giving a gift of downloadable digital content. A gift giver's client 102 connects via a network 104, e.g., the Internet, to a web server 106. The web server 106 serves to the gift giver's client 102 one or more web pages configured to enable a user of the gift giver's client 102 to select digital content and give the selected content as a gift to one or more recipients. In some embodiments, a client application and/or applet running on the gift giver's client 102 facilitates the selection of digital content and the giving of such content as a gift. In some embodiments, the client application and/or applet is available for download from the web server 106 and/or an associated server. Once installed, the client is invoked either by a user of the gift giver's client 102 on his/her own initiative or in response to a prompt and/or command received via network 104 from web server 106. Web server 106 is connected to a backend server 108 configured to perform business logic functions such as managing the retrieval, presentation, selection, purchase, and giving as a gift of digital content. The backend server 108 is connected to a digital content data store 110 in which items of downloadable digital content available to be given as a gift are stored. In various embodiments the digital content data store 110 comprises one or more physical storage devices, systems, and/or media. Backend server 108 is connected to a transaction data store 112 in which transaction data associated with transactions performed and/or facilitated by web server 106 and/or backend server 108 are stored. In some embodiments, data associated with gift transactions, e.g., details of a sale transaction in which the gift was and/or is being purchased, an identification of the digital content being given as a gift, a mapping of gift redemption codes to associated transaction records and/or digital content, status of gift delivery and redemption, etc. In some embodiments, a gift is delivered to a recipient via a communication, such as an email message, sent by web server 106 to the recipient, e.g., in the example shown in FIG. 1 to a recipient associated with recipient client 114. In some embodiments, the communication provides a gift redemption code usable by the recipient to obtain, without cost to the recipient, the digital content given as a gift. In some embodiments, a link, script, or other code included in and/or invoke by the email automates at least in part the gift redemption process, e.g., by doing one or more of accessing a web page configured to deliver the digital content given as a gift, providing a gift redemption code and/or other data required to be provided to redeem the gift, and/or managing all or part of the process of downloading the digital content to the recipient client 114. In some embodiments, to redeem a gift of digital content a client application, applet, and/or other software or code is required to be installed on the recipient client 114. In some embodiments, a web page served by web server 106 determines whether a required client application is installed on the recipient client 114 and, if not, provides an opportunity for the client application to be downloaded to the recipient client 114. In some embodiments, no client application is required and the gift redemption is completed using a web browser and/or other third party software.

Figure 2:
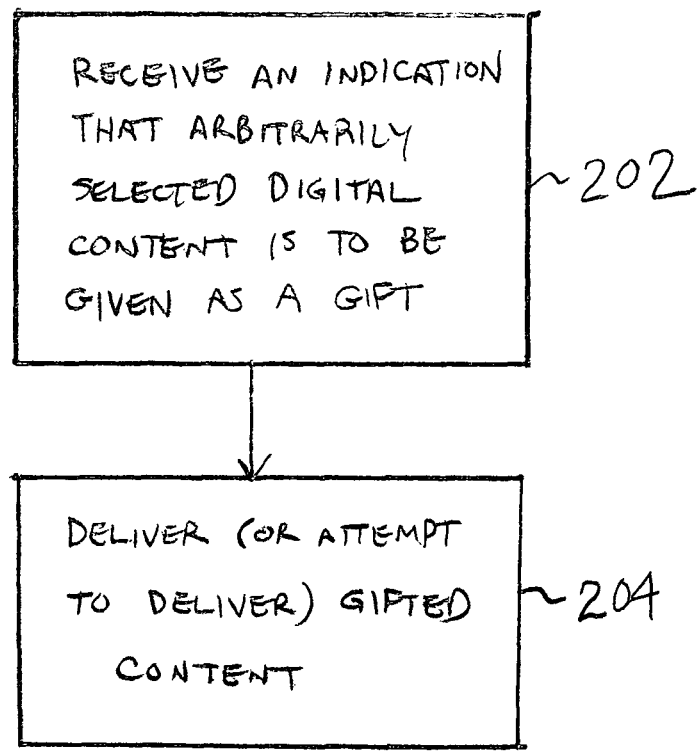
FIG. 2 is a flow chart of an embodiment of a process for enabling a user to give a gift of downloadable digital content.

FIG. 2 is a flow chart of an embodiment of a process for enabling a user to give a gift of downloadable digital content. At 202, an indication is received that arbitrarily selected digital content is to be given as a gift. In some embodiments, a user interface is provided to enable a gift giver to select one or more items of digital content to be included in a gift of digital content. In various embodiments, the user interface includes a web page, an interface provided by a client application, and/or a combination of the two. In some embodiments, the digital content includes one or more items of digital content selected arbitrarily by the gift giver from a library of digital content items available for purchase and/or download, such as a library of sound recordings, videos, images, documents, and/or other types of digital content. In some embodiments, the digital content includes one or more items of third party prerecorded digital content. An item may include a complete work or collection of works as released and/or otherwise conceived by a creator (e.g., artist or other performer) and/or other producer of an original work or set of works, such as a song or an album (e.g., the collection of songs included in an album as released), a subset of such a complete work or collection of works, and/or a collection of works and/or collections of works assembled by the gift giver or some third party other than a creator and/or other producer of one or more of the works or collections of works included in the item. Examples items that include collections of works include a play list or other collection of songs and/or other content created by the gift giver, e.g., for personal use and enjoyment and/or to share with others; a "top ten" type list of content items selected based on their popularity, e.g., in some applicable genre and/or to some associated sector of consumers; and a play list and/or other collection created by a third party whose judgment and/or taste a consumer may trust, such as a famous artist, performer, writer, critic, and/or other celebrity. An item or selected set of items in various embodiments may include any arbitrarily selected combination of items and/or collections of items included in a library of items and/or collection items available for purchase and/or download, regardless of their relationship to each other, type of content, format, etc. In some embodiments, 202 includes receiving a selection of one or more items of digital content, receiving an indication the selected content is to be given as a gift, receiving recipient data about the gift recipient, and processing a gift purchase transaction.

At 204, the digital content given as a gift is delivered or attempted to be delivered. In some embodiments, 204 includes providing a gift redemption code usable, e.g., by a recipient of the gift, to obtain the digital content. In some embodiments, 204 includes receiving a gift redemption request, determining whether the digital content given as a gift is currently available, and if so downloading the digital content to the gift recipient.

Figure 3:
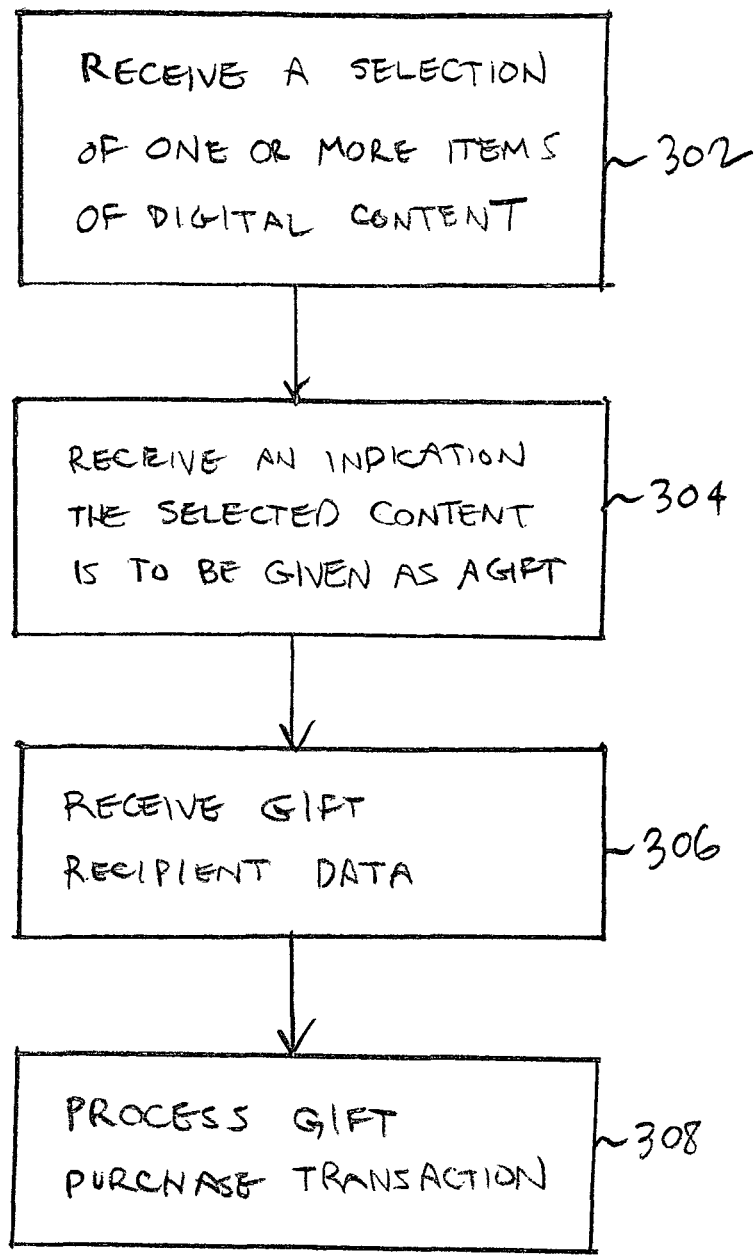
FIG. 3 is a flow chart illustrating an embodiment of a process for receiving an indication that selected digital content is to be given as a gift.

FIG. 3 is a flow chart illustrating an embodiment of a process for receiving an indication that selected digital content is to be given as a gift. In some embodiments, 202 of FIG. 2 includes the process of FIG. 3. At 302, a selection of one or more items of digital content is received. In various embodiments, the selection may include one or more items and/or collections of items selected arbitrarily, e.g., by the gift giver, from a library of digital content items and/or collections of items available for purchase and/or download. At 304, an indication is received that the selected content is to be given as a gift. At 306, gift recipient data, e.g., a name, email or other address, and/or other information about the recipient, is received. At 308, a gift purchase transaction is processed. In some embodiments, completing the purchase transaction includes a giver of the gift provides payment for the gift. In some embodiments, the purchase transaction is completed at a time at which the gift is given. In some embodiments, the purchase transaction is completed at a time at which the gift is redeemed. In some embodiments, a credit card or other financial account, instrument, and/or source of funds is charged and/or debited in 308 at the time a gift is sent. In some embodiments, a gift purchase is or at the option of the consumer may be consolidated with one or more other purchase and/or gift transactions into a consolidated transaction which is subsequently processed as a single transaction, which in some embodiments results in a savings of transaction related fees. In some alternative embodiments, the gift giver is not charged until the time a gift is redeemed by the gift recipient. In various embodiments, one or more of 302, 304, 306, and/or 308 are combined and/or occur in a different order than as listed in FIG. 3. For example, in some embodiments the act of providing recipient data (306) is understood as and/or has the effect of an indication that the selected content is to be given as a gift (304).

Figure 4:
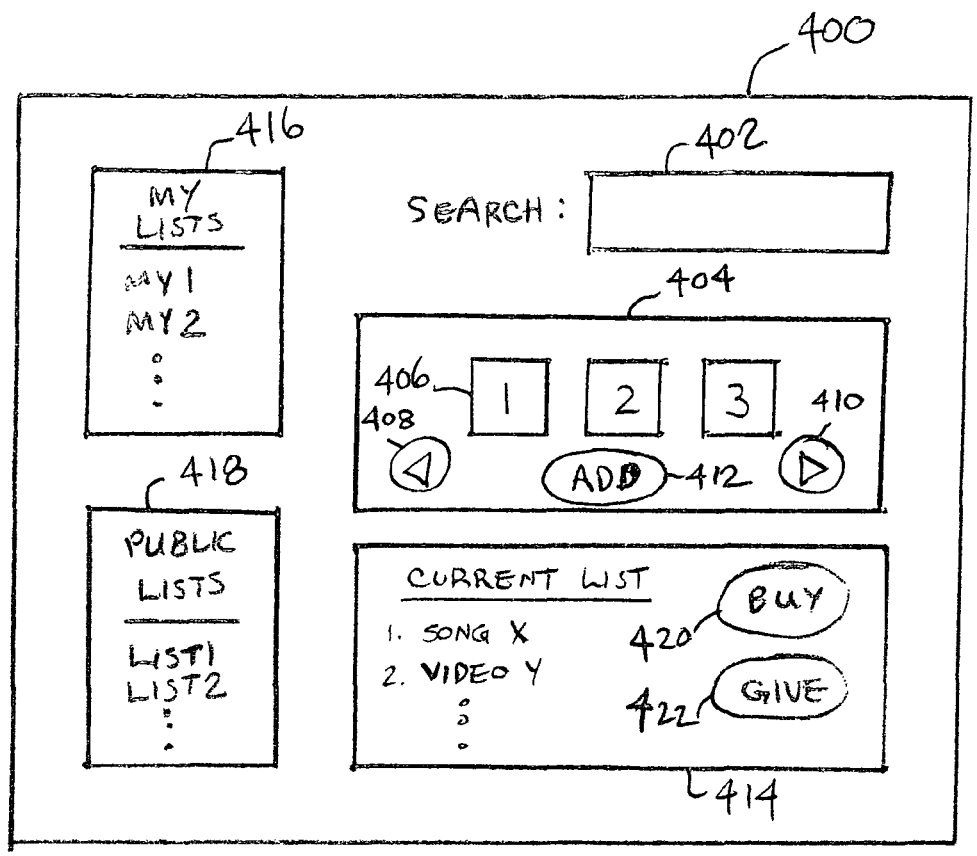
FIG. 4 illustrates an embodiment of a user interface usable to give a gift of digital content.

FIG. 4 illustrates an embodiment of a user interface usable to give a gift of digital content. The user interface display 400 includes a search text entry box 402 in which a user may enter search terms to search for digital content of interest, such as a title, artist/performer's name, producer, label, genre, lyrics, etc. A current results display area 404 displays icons, text, and/or other data, such as icon 406, representing digital content items currently being presented to a user of the display 400, e.g., in response to a search entered in box 402 and/or a browse command entered via a browse control such as "previous" button 408 and/or "next" button 410. Activating an "add" button 412 causes a currently selected digital content item, such as an item associated with icon 406, to be selected and added to a list of selected content list in a "selected" content display area 414. In the example show, a "song X" and "video Y" have been selected. A user play list display area 416 shows lists comprising collections of digital content items created by the user to which the display 400 is provided, such as personal play lists including songs selected previously by the user. Third party collections, such as "top ten", mix, or celebrity play lists, are listed in a third party play list display area 418. In the example shown, a user and/or third party play list is added to the list of selected digital content as displayed in display area 414 by selecting a list from display area 416 and/or 418, such as by double clicking on the list name, dragging and dropping the list into the display area 414, and/or selecting the list and activating an "add" button or control, such as add button 412. A "buy" button 420, when activated, enables a user to purchase and/or download for his/her own use the selected digital content displayed in display area 414. In the example shown, a "give" button 422 enables a user to indicate that the selected digital content displayed in display area 414 is to be given as a gift.

Figure 5:
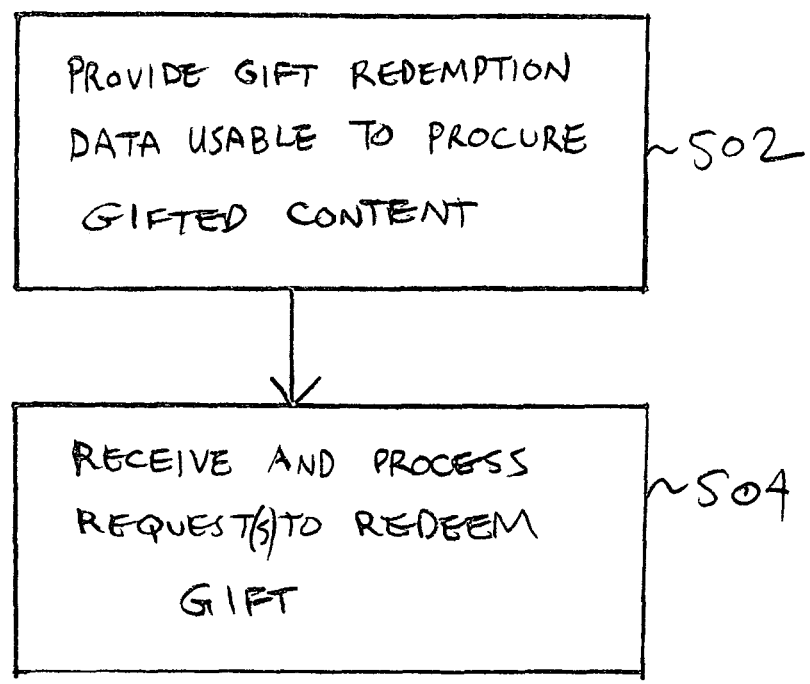
FIG. 5 is a flow chart illustrating an embodiment of a process for delivering (or attempting to deliver) a gift of digital content.

FIG. 5 is a flow chart illustrating an embodiment of a process for delivering (or attempting to deliver) a gift of digital content. In some embodiments, 204 of FIG. 2 includes the process of FIG. 5. At 502, a gift redemption data usable to download the digital content given as a gift is provided. In some embodiments, 502 includes generating a redemption code, mapping the code to the digital content given as a gift, e.g., by associating the code with a gift transaction record, and sending the gift redemption code to the gift recipient(s). At 504, a request to redeem a gift is received and processed, e.g., by delivering and/or attempting to deliver to the gift recipient the digital content given as a gift. In some embodiments, the same set of digital content items may be given to more than one recipient, in which case at 502 a gift redemption data is generated for and provided to each gift recipient and 504 is repeated as each recipient redeems (or attempts to redeem) his/her gift.

Figure 6:
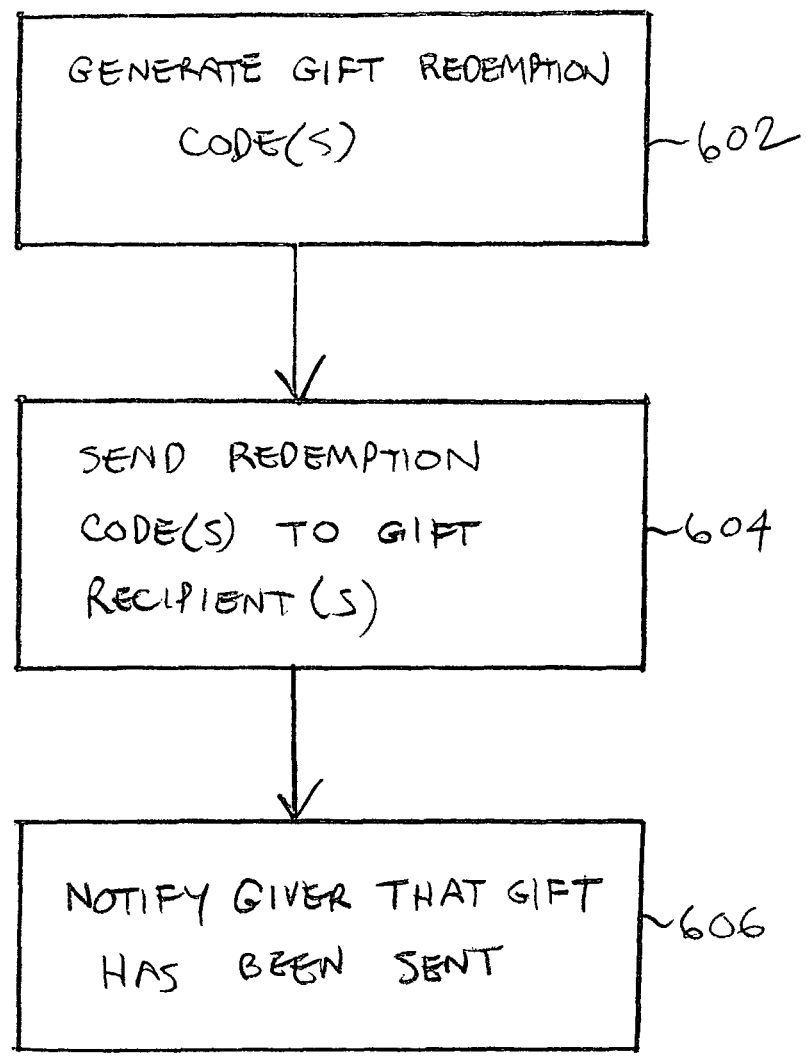
FIG. 6 is a flow chart illustrating an embodiment of a process for generating and providing gift redemption data.

FIG. 6 is a flow chart illustrating an embodiment of a process for generating and providing gift redemption data. In some embodiments, 502 of FIG. 5 includes the process of FIG. 6. At 602, a gift redemption code is generated for each gift and/or recipient. In some embodiments, a twelve digit randomized code is used. At 604, each gift redemption code is sent to a gift recipient with which it is associated. In some embodiments, the gift redemption code is sent to the gift recipient via email. A user interface and/or display presented to a giver of the gift is used to obtain gift recipient data, as in 306 of FIG. 3, including, e.g., one or more of a name of the gift recipient, a name of the gift giver, an email (or other) address to which the gift redemption data is to be sent, and a free form message to be included with the gift redemption data, e.g., a personal greeting or other message. At 606, an indication is provided to the gift giver that the gift has been sent. In various embodiments, 606 includes sending an email to the gift giver and/or updating a gift status data that results in the gift giver being notified that the gift has been sent, e.g., in response to the gift giver checking the status of the gift, such as in or through a gift and/or transaction status functionality provided via a website and/or client installed at the gift giver's client system.

Figure 7:
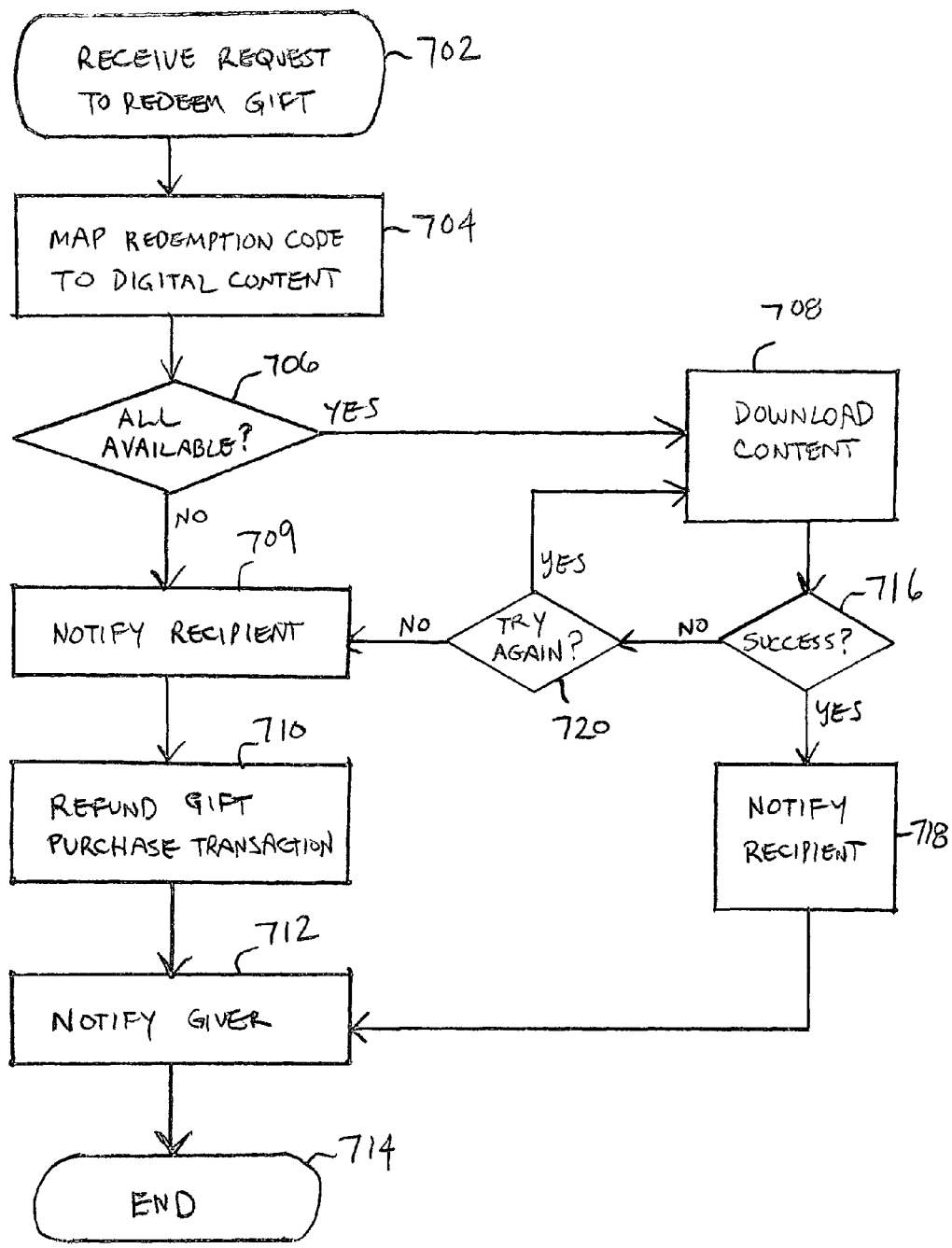
FIG. 7 is a flow chart of an embodiment of a process for delivering or attempting to deliver to a gift recipient digital content given as a gift.

FIG. 7 is a flow chart of an embodiment of a process for delivering or attempting to deliver to a gift recipient digital content given as a gift. In some embodiments, 504 of FIG. 5 includes the process of FIG. 7. At 702, a request to redeem a gift is received. In some embodiments, 702 includes receiving a gift redemption code associated with the gift. At 704, a gift redemption code (or other data) received at 702 is mapped to the digital content item(s) given as a gift, e.g., by mapping the code to a gift purchase transaction through which the gift was purchased or mapping the code directly to the content. At 706, it is determined whether all the content included in the gift currently is available for download to the recipient. If all the content is available, at 708 an attempt is made to download to the recipient the digital content items included in the gift. In some embodiments, a client application or other code is required to be installed on a client system associated with the recipient in order for the digital content to be downloaded. In various such embodiments, 708 includes determining whether the required client is installed, offering an opportunity to download the client if it is not already installed, and/or returning a "failed" result for the download attempt if the recipient declines to downloaded and/or install the client and/or the client cannot be installed for some other reason. In some embodiments, a browser or similar software is used. In the example shown, if all of the digital content items included in the gift are not available—e.g., because one or more of the items is no longer available for download—the gift recipient is notified that the gift cannot be redeemed (709), the gift purchase transaction is refunded (710), and the gift giver is notified of the fact that the gift cannot be redeemed (712), after which the process of FIG. 7 ends (714). In some alternative embodiments, if only a subset of items included in a gift are determined at 706 to not be available for download, any remaining item(s) that remain available are downloaded (or attempted to be downloaded), as at 708, and 709, 710, and 712 are performed as described above only with respect to those items that cannot be downloaded at the time of redemption (e.g., a partial refund is provided). If the content is determined at 706 available and an attempt to download is made at 708, it is determined at 716 whether the digital content (e.g., whether all items included in the gift) was successful. If the download was successful, the gift recipient is notified at 718 that the download was completed successfully, and at 712 the gift giver is notified that the gift has been redeemed, after which the process ends (714). If the download was not successful (716), it is determined at 720 whether a further attempt to download the digital content (or in some embodiments a remaining portion thereof that has not yet been downloaded successfully, e.g., in the event of an interrupted and/or otherwise partially successful download) should be initiated. In various embodiments, whether a further attempt to download is made depends on the reason the download failed (if known)—e.g., a failure caused by a communication failure and/or internal server error may result in a retry, but failure due to a corrupted source file may not—and/or how many unsuccessful attempts have already been made to download the content to the recipient. If it is determined that a further attempt to download should be made, the process returns to 708 and a further attempt is made. Otherwise, the recipient is notified the gift could not be redeemed (709), the gift purchase transaction is refunded (710), and the giver is notified the gift could not be redeemed (712), after which the process of FIG. 7 ends (714).

Figure 8:
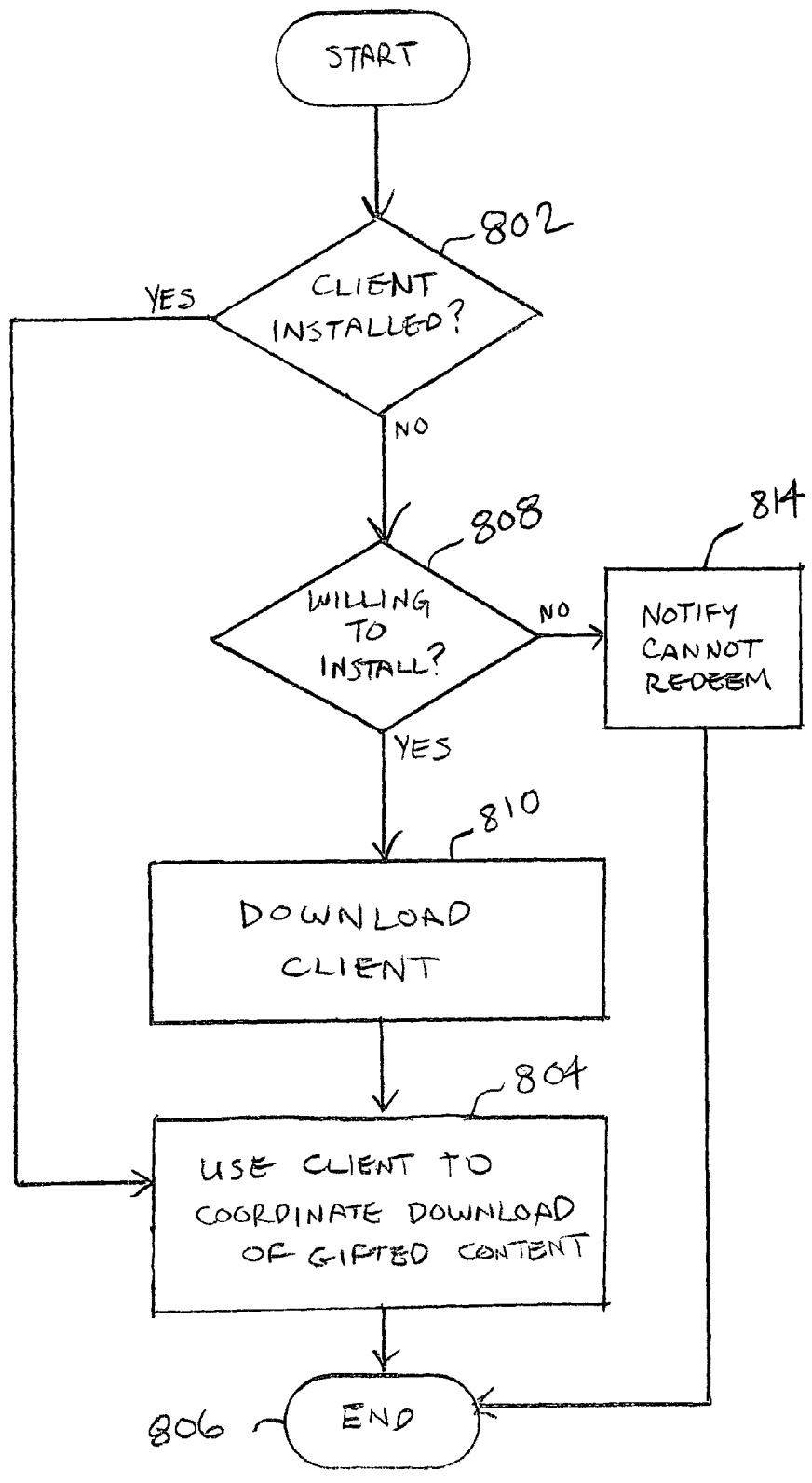
FIG. 8 is a flow chart illustrating an embodiment of a process for using a client application to download digital content given as a gift.

FIG. 8 is a flow chart illustrating an embodiment of a process for using a client application to download digital content given as a gift. In some embodiments, 708 of FIG. 7 includes the process of FIG. 8. At 802 it is determined whether a client to be used to download digital content given as a gift is installed on a recipient host to which the digital content is desired to be downloaded. If the client is present, at 804 it is used to coordinate download of the digital content given as a gift, after which the process of FIG. 8 ends (806). If the client is not present (802), it is determined whether the recipient is willing to install the client (808). If so, the client is downloaded and installed (810) and then used in 804 to coordinate download of the digital content given as a gift, after which the process of FIG. 8 ends (806). If the client is not present (802) and the recipient is unwilling (or in some embodiments unable) to install the client (808), at 814 the recipient is notified that the gift cannot be redeemed (e.g., as a result of the recipient's failure, refusal, and/or inability to download and install the client) and the process of FIG. 8 ends (806).

Figure 9:
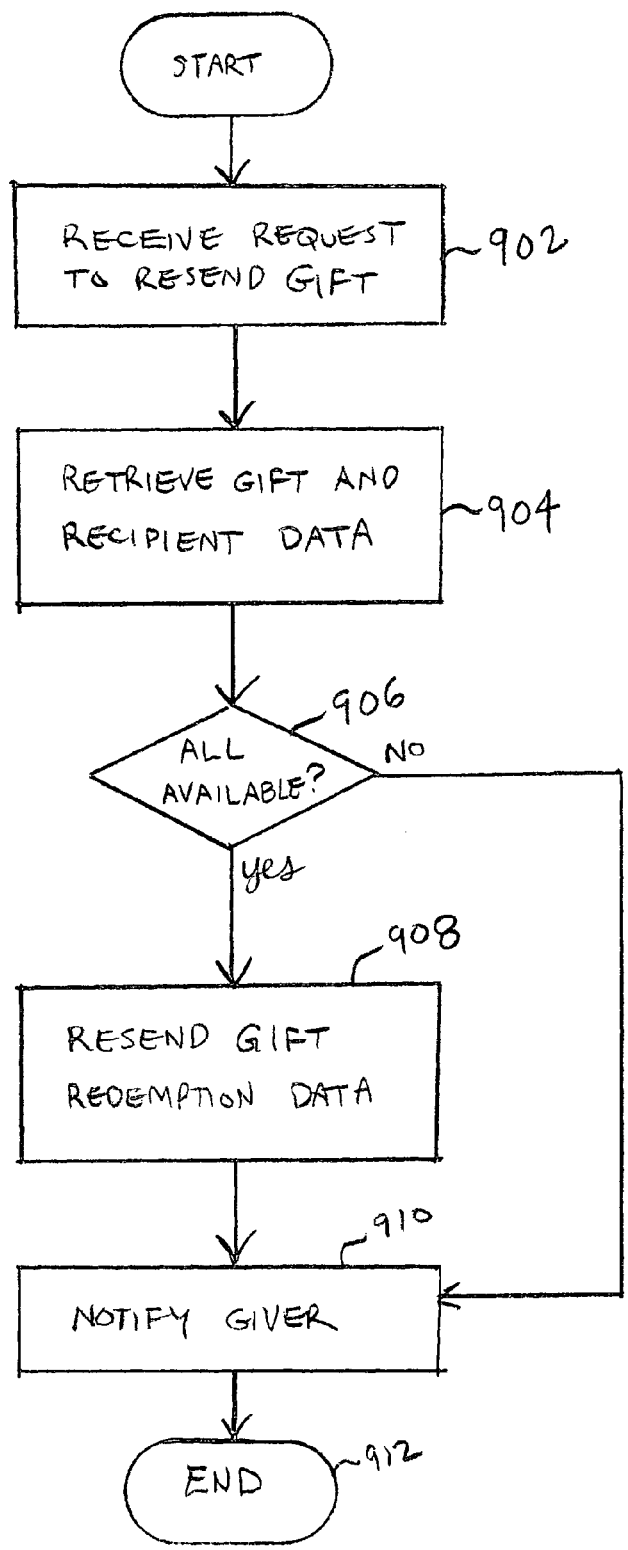
FIG. 9 is a flow chart illustrating an embodiment of a process for enabling a gift of digital content to be resent.

FIG. 9 is a flow chart illustrating an embodiment of a process for enabling a gift of digital content to be resent. In some embodiments, the process of FIG. 9 may be invoked by a gift giver, e.g., via a user interface presented by a client or other application, to resend a gift, e.g., one that has been lost and/or accidentally deleted by a recipient prior to redemption or one that did not get delivered to the intended recipient, e.g., because an invalid or incorrect email address for the recipient was provided by the gift giver. At 902, a request to resend a gift is received. At 904, associated gift and recipient data are retrieved. At 906, it is determined whether all content included in the gift is still available. If not, the gift giver is notified that the gift as originally defined cannot be resent (910) and the process of FIG. 9 ends (912). If the content remains available (906), the gift redemption data is resent (908) and the gift giver is notified that the gift has been resent (910), after which the process of FIG. 9 ends (912).

Figure 10:
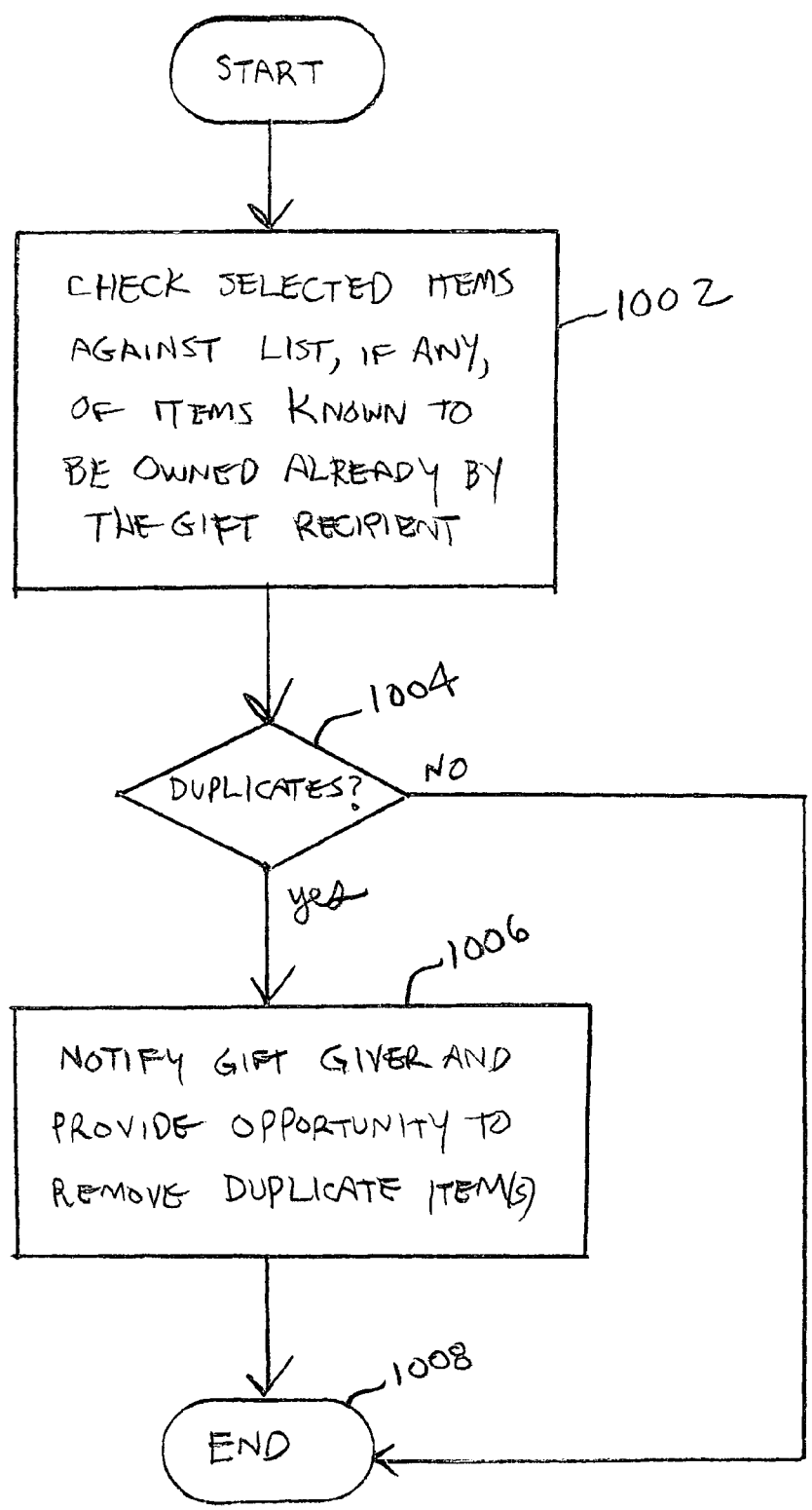
FIG. 10 is a flow chart illustrating an embodiment of a process for determining whether a recipient already has one or more items of digital content selected to be given as a gift to the recipient.

FIG. 10 is a flow chart illustrating an embodiment of a process for determining whether a recipient already has one or more items of digital content selected to be given as a gift to the recipient. In some embodiments, the duplicate checking process of FIG. 10 is included in 302 and/or 304 of FIG. 3 and/or as a separate check performed each time a giver submits a request to give selected content as a gift. At 1002, the item(s) selected to be given as a gift are checked against a list of items known to be owned and/or otherwise possessed by the indicated recipient of the gift. In some embodiments, if the indicated recipient is a current user of a service being used to make the gift, a database of items already owned and/or otherwise possessed by users such as the recipient is checked to determine if the recipient already has one or more of the items. In various embodiments the data resides on a server or other location to which the recipient's list of items has been uploaded and/or on a host associated with the recipient, e.g., in an item list maintained by and/or associated with a client application installed at the host. In some embodiments, 1002 includes interrogating, at the time a selection of items to be included in a gift is made and/or at a later time, such as a time when the recipient submits a request to redeem the gift, a client application and/or agent on a host associated with the recipient. If not data is available for the recipient and/or no duplicates are found (1004), the process of FIG. 10 ends (1008) and the gift transaction proceeds normally. If one or more duplicates are found (1004), the gift giver is notified and given an opportunity to remove the duplicate item(s) from the gift, after which the process of FIG. 10 ends (1008). In some embodiments, 1006 includes returning the gift giver to a content item selection display in which the duplicate item(s) is/are identified. Once the gift giver has removed or chosen not to remove items indicated as being duplicates, the giver resubmits the gift request which is then processed as described above, except that in some embodiments the process of FIG. 10 is not invoked unless one or more new items have been added, in which case the duplicate check process of FIG. 10 is performed with respect to such newly added item(s).

Figure 11:
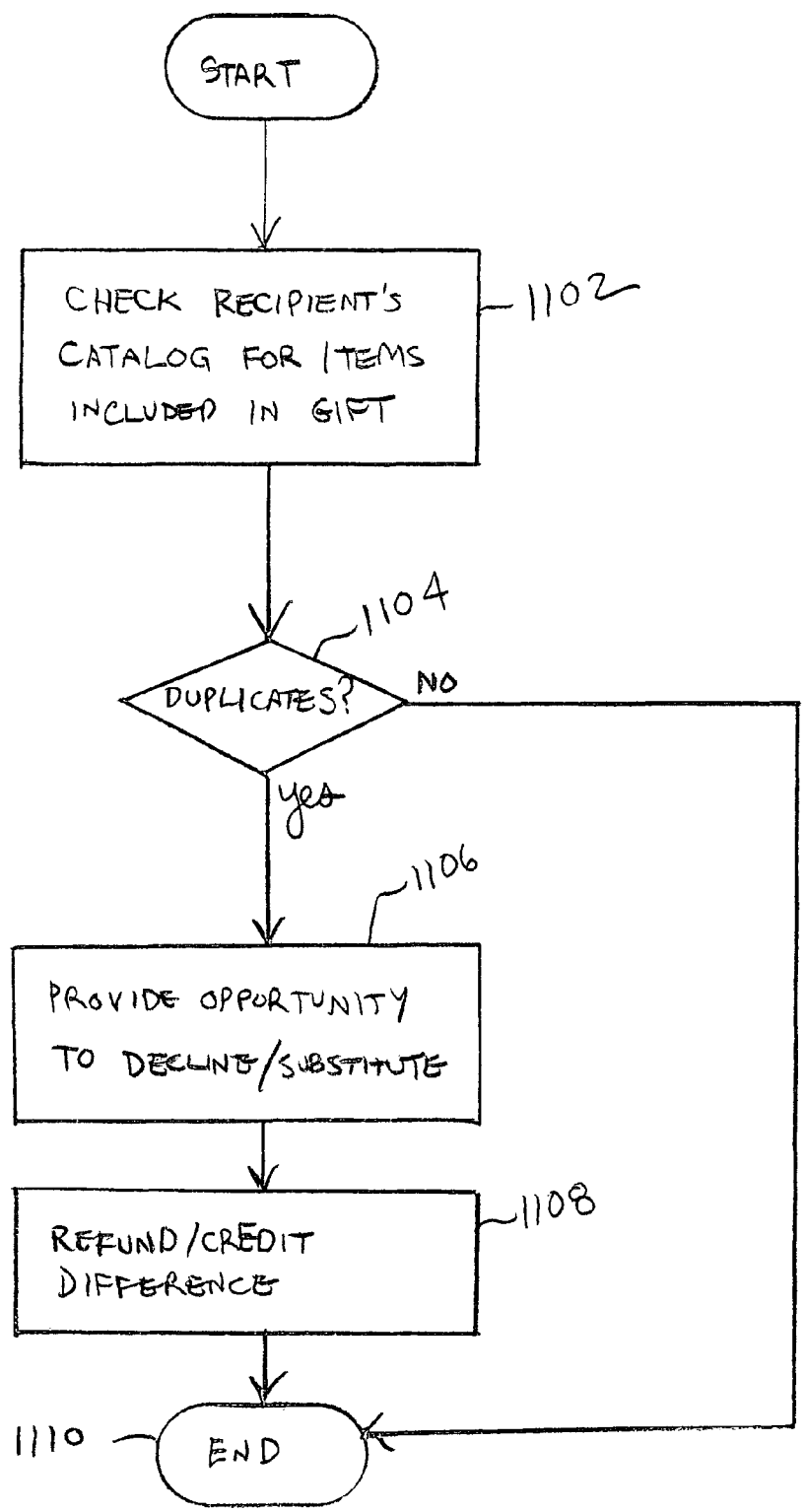
FIG. 11 is a flow chart illustrating an embodiment of a process for checking for duplicates at the time of gift redemption.

FIG. 11 is a flow chart illustrating an embodiment of a process for checking for duplicates at the time of gift redemption. In some embodiments, the process of FIG. 11 is included in and/or invoked at and/or in connection with 708 of FIG. 7. At 1102, the gift recipient's catalog of items is checked for items included in the gift. In some embodiments, 1102 includes communicating with a client application and/or agent installed at the recipient's host. If there are no duplicates (1104), the process of FIG. 11 ends (1110) and the gift redemption proceeds normally, e.g., as described above. If one or more duplicate items are found (1104), the recipient in the example shown is provided an opportunity to decline to download the duplicate item(s) and/or to substitute an item of the same or lesser value for each duplicate item, if any. At 1108, the difference between the cost of content the recipient has indicated he/she desires to download (e.g., non-duplicate items, duplicate items not declined by the recipient, and/or substitute items selected by the recipient) is in various embodiments refunded automatically to the gift giver and/or credited to an account of the giver and/or recipient, after which the process of FIG. 11 ends (1110).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, by a processor, an indication that a first downloadable item of third party prerecorded digital content was selected by a purchasing user to be given as a gift to a recipient, the first downloadable item associated with a first monetary value required to purchase the first downloadable item;

determining, by the processor, whether the first downloadable item is a duplicate of an existing downloadable item present in the recipient's catalog of items;

when the downloadable item is a duplicate of an existing downloadable item present in the recipient's catalog of items, prompting, by the processor, the recipient to select a substitute downloadable item of third party prerecorded digital content, wherein the substitute downloadable item is associated with a second monetary value required to purchase the substitute downloadable item, and the second monetary value is not greater than the first monetary value;

receiving, by the processor, a selection from the recipient, the selection:
  identifying the substitute downloadable item, and
  indicating that the recipient would like to receive the substitute downloadable item instead of the first downloadable item;

delivering, by the processor, the substitute downloadable item to the recipient; and upon a determination that the recipient has received the substitute downloadable item, debiting, by the processor, the second monetary value from an account associated with the purchasing user.

2. The method of claim 1, wherein determining whether the first downloadable item is a duplicate of the existing downloadable item comprises:
  checking a list of items known to be owned and/or otherwise possessed by the recipient.

3. The method of claim 1, wherein determining whether the first downloadable item is a duplicate of the existing downloadable item comprises:
  interrogating a client application on a client device of the recipient.

4. The method of claim 1, further comprising:
  generating a redemption code; and
  mapping the redemption code to the substitute downloadable item, wherein delivering the substitute downloadable item to the recipient includes transmitting the redemption code to the recipient.

5. The method of claim 1, further comprising:
  determining whether a client application necessary to download the substitute downloadable item is present on a client device of the recipient.

6. The method of claim 5, further comprising:
  when the client application is not present on the client device of the recipient, prompting the client to download the client application.

7. The method of claim 1, further comprising:
  upon a determination that the recipient has received the substitute downloadable item, transmitting a notification to the purchasing user that substitute downloadable item has been delivered to the recipient.

8. The method of claim 1, wherein the receiving an indication that a first downloadable item of third party prerecorded digital content was selected by the purchasing user to be given as a gift to the recipient further comprises:
  receiving recipient data identifying the recipient.

9. The method of claim 8, wherein the recipient data includes an e-mail address of the recipient and the substitute downloadable item is delivered to the e-mail address of the recipient.

10. A system comprising:
  a processor; and
  a memory containing instructions that, when executed, cause the processor to:
    receive an indication that a first downloadable item of third party prerecorded digital content was selected by a purchasing user to be given as a gift to a recipient, the first downloadable item associated with a first monetary value required to purchase the first downloadable item;
    determine whether the first downloadable item is a duplicate of an existing downloadable item present in the recipient's catalog of items;
    when the downloadable item is a duplicate of an existing downloadable item present in the recipient's catalog of items, prompt the recipient to select a substitute downloadable item of third party prerecorded digital content, wherein the substitute downloadable item is associated with a second monetary value required to purchase the substitute downloadable item, and the second monetary value is not greater than the first monetary value;
    receive a selection from the recipient, the selection:
      identifying the substitute downloadable item, and
      indicating that the recipient would like to receive the substitute downloadable item instead of the first downloadable item;
    deliver the substitute downloadable item to the recipient; and
    upon a determination that the recipient has received the substitute downloadable item, debit the second monetary value from an account associated with the purchasing user.

11. The system of claim 10, wherein determining whether the first downloadable item is a duplicate of the existing downloadable item comprises:
  checking a list of items known to be owned and/or otherwise possessed by the recipient.

12. The system of claim 10, wherein determining whether the first downloadable item is a duplicate of the existing downloadable item comprises:
  interrogating a client application on a client device of the recipient.

13. The system of claim 10, wherein the instructions further cause the processor to:
  generate a redemption code; and
  map the redemption code to the substitute downloadable item, wherein delivering the substitute downloadable item to the recipient includes transmitting the redemption code to the recipient.

14. The system of claim 10, wherein the instructions further cause the processor to:
  determine whether a client application necessary to download the substitute downloadable item is present on a client device of the recipient.

15. The system of claim 14, wherein the instructions further cause the processor to:
  when the client application is not present on the client device of the recipient, prompt the client to download the client application.

16. The system of claim 10, wherein the instructions further cause the processor to:
  upon a determination that the recipient has received the substitute downloadable item, transmit a notification to the purchasing user that substitute downloadable item has been delivered to the recipient.

17. The system of claim 10, wherein the receiving an indication that a first downloadable item of third party prerecorded digital content was selected by the purchasing user to be given as a gift to the recipient further comprises:

receiving recipient data identifying the recipient.

18. The system of claim 17, wherein the recipient data includes an e-mail address of the recipient and the substitute downloadable item is delivered to the e-mail address of the recipient.

19. A non-transitory computer-readable medium containing instruction that, when executed by a computing device, causes the computing device to:

receive an indication that a first downloadable item of third party prerecorded digital content was selected by a purchasing user to be given as a gift to a recipient, the first downloadable item associated with a first monetary value required to purchase the first downloadable item;

determine whether the first downloadable item is a duplicate of an existing downloadable item present in the recipient's catalog of items;

when the downloadable item is a duplicate of an existing downloadable item present in the recipient's catalog of items, prompt the recipient to select a substitute downloadable item of third party prerecorded digital content, wherein the substitute downloadable item is associated with a second monetary value required to purchase the substitute downloadable item, and the second monetary value is not greater than the first monetary value;

receive a selection from the recipient, the selection:
identifying the substitute downloadable item, and
indicating that the recipient would like to receive the substitute downloadable item instead of the first downloadable item;

deliver the substitute downloadable item to the recipient; and upon a determination that the recipient has received the substitute downloadable item, debit the second monetary value from an account associated with the purchasing user.

20. The non-transitory computer-readable medium of claim 19, wherein determining whether the first downloadable item is a duplicate of the existing downloadable item comprises:

checking a list of items known to be owned and/or otherwise possessed by the recipient.

21. The non-transitory computer-readable medium of claim 19, wherein determining whether the first downloadable item is a duplicate of the existing downloadable item comprises:

interrogating a client application on a client device of the recipient.

22. The non-transitory computer-readable medium of claim 19, wherein the instructions further cause the computing device to:

generate a redemption code; and
map the redemption code to the substitute downloadable item, wherein delivering the substitute downloadable item to the recipient includes transmitting the redemption code to the recipient.

23. The non-transitory computer-readable medium of claim 19, wherein the instructions further cause the computing device to:

determine whether a client application necessary to download the substitute downloadable item is present on a client device of the recipient.

24. The non-transitory computer-readable medium of claim 23, wherein the instructions further cause the computing device to:

when the client application is not present on the client device of the recipient, prompt the client to download the client application.

25. The non-transitory computer-readable medium of claim 19, wherein the instructions further cause the computing device to:

upon a determination that the recipient has received the substitute downloadable item, transmit a notification to the purchasing user that substitute downloadable item has been delivered to the recipient.

26. The non-transitory computer-readable medium of claim 19, wherein the receiving an indication that a first downloadable item of third party prerecorded digital content was selected by the purchasing user to be given as a gift to the recipient further comprises:

receiving recipient data identifying the recipient.

27. The non-transitory computer-readable medium of claim 26, wherein the recipient data includes an e-mail address of the recipient and the substitute downloadable item is delivered to the e-mail address of the recipient.

* * * * *